US012554398B2

United States Patent
Laslo et al.

(10) Patent No.: US 12,554,398 B2
(45) Date of Patent: Feb. 17, 2026

(54) KV CACHE BLOCK-QUANTIZATION ORIENTED DATA HANDLING

(71) Applicant: Microsoft Technology Licensing, LLC, Redmond, WA (US)

(72) Inventors: Ori Laslo, Rehovot (IL); Gilad Kirshenboim, Petach Tiqva (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 36 days.

(21) Appl. No.: 18/772,712

(22) Filed: Jul. 15, 2024

(65) Prior Publication Data

US 2026/0016952 A1    Jan. 15, 2026

(51) Int. Cl.
G06F 3/00    (2006.01)
G06F 3/06    (2006.01)

(52) U.S. Cl.
CPC ............ G06F 3/0604 (2013.01); G06F 3/064 (2013.01); G06F 3/0683 (2013.01)

(58) Field of Classification Search
None
See application file for complete search history.

(56) References Cited

U.S. PATENT DOCUMENTS

2016/0172060 A1*  6/2016  Kim ................. G11C 29/56012
                                                        365/191

* cited by examiner

Primary Examiner — Midys Rojas
(74) Attorney, Agent, or Firm — CALFEE, HALTER & GRISWOLD LLP

(57) ABSTRACT

A computing system for performing runtime data handling optimization for generative models is provided. The computing system comprises at least one processor and memory comprising a first memory and a second memory, wherein the memory stores instructions that, when executed by the at least one processor, cause the at least one processor to execute a generative model. The computing system computes a first value matrix entry based upon the processing of an input to the generative model. The first value matrix entry is stored in a first memory wherein a first group of value matrix entries is identified. The computing system executes data quantization on the first group of value matrix entries which results in a first quantized value matrix. The first quantized value matrix is added to a second memory where it can be used during generation of the generative model. When the first group of value matrix entries is less than a group size parameter, data padding matrix values are generated and used during execution of the data quantization.

20 Claims, 14 Drawing Sheets

KV CACHE BLOCK-QUANTIZATION ORIENTED DATA HANDLING

BACKGROUND

Generative artificial intelligence (AI) models have recently been developed to generate complex outputs based upon structured inputs known as prompts. These models, which include language models (e.g., large language model (LLM), small language model (SLM), etc.), receive a prompt as input and in near real-time (e.g., within a few seconds of receiving the input) generate an output that is responsive to the input prompt. The output generated by the model is often human readable text, but models can also produce output in the form of computer-executable source code, images, music, video, etc. The output generated by the generative model is based upon training data over which the model has been trained. With "large" models, the number of parameters within the trained model is in the billions. While this enables generative models to produce sophisticated output based upon large-scale training data, the computing resources required by the computing system executing the generative model are significant.

Recent advancements in generative models are largely based upon transformer architecture. Transformers introduced the concept of parallel processing of input tokens as opposed to sequential processing as was used in conventional natural language processing (NLP) technologies. Transformer-based generative models perform parallel processing of input tokens by way of a concept known as attention. Attention enables the model to determine parts of an input sequence that are more likely to be significant in generating accurate and responsive output, and thus more "attention" can be applied by the model during output generation. The attention mechanism also enables generative models to handle larger input lengths while still generating an accurate output.

In general, transformer-based generative models process input as a sequence of tokens and generate an output based upon contextual inference of the model. Each successive output token is generated in part based upon its preceding tokens. The generative model retains the information from each successive input-output sequence which enables a conversational interaction with the model. The total number of tokens that the model may consider when generating the next output token is referred to as the context length. As the number of tokens considered by the model approaches the maximum context length, computing system executing the model begins to run out of memory resources. Once the number of tokens exceeds the maximum context length, the model will either crash or past tokens are dropped from memory. Deleting past tokens from memory causes the model to "forget" certain information when generating the next token. This can lead to inaccurate or contradictory output to be generated by the model as it fails to consider earlier information when generating the new output.

Conventionally, computing systems executing generative models are scaled up to include greater hardware resources to accommodate the computational demands of the model. As demand for generative model resources and model complexity increase, scaling the computing system hardware resources to accommodate execution of the models becomes impractical or impossible. Due to the computational resources required for execution of a generative model, optimization of a computing system's memory use during execution of the model can enhance the model's maximum context length, improve memory capacity and throughput requirements, as well as improve the operational latency of the model.

SUMMARY

The following is a brief summary of subject matter that is described in greater detail herein. This summary is not intended to be limiting as to the scope of the claims.

Various technologies pertaining to data handling optimization for execution of a generative model are described herein. More specifically, the technologies described herein are directed towards runtime optimization of the memory storing the Key and Value matrices (collectively referred to as the "KV cache") which are used to retain values for past tokens used by the generative model to generate output. It is a general aspect of generative models that the models require substantial computing resources to execute, specifically at inference time when the model is generating the next output token. For example, generative models require substantial memory resources to accommodate the context length of the model, which dictates how many prior tokens the model may consider when generating its next output.

Conventionally, computing systems executing generative models are scaled up to include greater hardware resources to accommodate the computational demands of the model. For example, to accommodate a larger context length, the computing system executing the generative model adds more memory resources. However, as model complexity and demand for generative model resources increase, scaling the computing system hardware resources to accommodate execution of the models becomes impractical or impossible. Optimization of the computing system executing the model and how it processes information reduces the consumption of computing resources and allows the model to run on a wider range of computing systems, for example, those with limited hardware resources (e.g., edge computing devices).

In one conventional approach, optimization of generative model execution involves quantization of certain values used by the model. Data quantization involves compressing data values to use a smaller number of bits. For example, data quantization may reduce the data precision format used to represent a value used by the model (e.g., from floating point 32 (FP32) to floating point (FP16), from FP16 to 8-bit integer (INT8), etc.). While quantization reduces the latency and computational resource demand of the model, it is typically applied to values before execution of the generative model. Further optimization may be realized through improved data handling architecture that enables quantization of data generated at runtime; more specifically, modifying how certain values are stored and retrieved in memory of the computing system executing the generative model. Furthermore, quantizing certain values is more challenging based upon how the values generated and stored in memory which necessitates improved data handling architecture.

In an aspect of the technologies described herein, the KV cache used by a generative model to retain values for previously computed tokens is optimized by way of executing data quantization on data stored in the KV cache. In an example, during execution, an exemplary generative model stores in memory previous matrix multiplication results that are computed during the self-attention phase of each decoder head of the model. For example, when an input $x_n$ is entered into a decoder of the model, the input is split to the multiple heads of the decoder, then undergoes a matrix multiplication operation with three weight matrices, shown below in equations 1-3:

$$q_n = x_n \cdot W_Q \quad (1)$$

$$k_n = x_n \cdot W_K \quad (2)$$

$$v_n = x_n \cdot W_V \quad (3)$$

Afterward, the model causes the key matrix entry $k_n$ to be transposed and stored in memory as part of the K cache. The values of the key matrix entry $k_n$ are horizontally concatenated with K results from previous inferences of the generative model according to equation 4:

$$K_n^T = \begin{bmatrix} K_{n-1}^T & | & k_n^T \end{bmatrix} \quad (4)$$

The model causes the value matrix entry $v_n$ to be stored in memory as part of the V cache. The values of the value matrix $v_n$ are vertically concatenated with V results from previous inferences of the generative model according to equation 5:

$$V_n = \begin{bmatrix} V_{n-1} \\ v_n \end{bmatrix} \quad (5)$$

The values stored in the KV cache (the resultant K and V matrices) are fetched by the generative model during computation of the next stage of self-attention by the generative model according to equation 6:

$$y_n = \text{Softmax}\left(\frac{q_n \cdot K_n^T}{\sqrt{d_k}}\right) \cdot V_n \quad (6)$$

As explained above, optimization of the execution of the generative model can be achieved through quantization of values used by the generative model. For weights values used by the generative model, data quantization can be performed prior to execution of the generative model. However, for the KV cache, quantization cannot be performed prior to inference execution because the KV cache is generated at the inference stage (e.g., during runtime). Moreover, the matrix values used by the generative model are fetched from memory column by column. This creates an issue with respect to how data quantization can be applied to the KV cache. For example, because each new matrix value $k_n$ added to the K cache is horizontally concatenated, each newly computed value corresponds to a new column of the $K_n^T$ matrix and each column can be quantized together. However, because the V cache is vertically concatenated, each new matrix value $v_n$ is added to the V cache row by row. Quantization of the V cache must be performed using blocks that divide the V cache columns so that they may be fetched column by column during execution of the generative model.

Certain functionality of the technologies described herein are illustrated through the following examples. In a first example, a computing system comprising at least one processor and memory is described. The memory comprises at least a first memory and a second memory. The memory stores instructions that, when executed by the at least one processor, cause the processor to execute a generative model, wherein the generative model receives an input and generates an output responsive to the input. In some examples, the generative model is a transformer-based language model (e.g., large language model (LLM), small language model (SLM), etc.).

In one example, the computing system further comprises a neural processing unit (NPU) configured to perform operations during the execution of the generative model. During execution of the generative model, the computing system receives input into the generative model and causes the generative model to generate an output based upon the input. In an example, the input comprises text comprising words which are represented as a plurality of tokens. As described above, input tokens are processed by the generative model and used to generate output tokens. In general, the generative model processes a plurality of tokens simultaneously when digesting an input prompt, and after initial key and value matrix values are computed, generates each output token individually based upon the input and the prior tokens generated by the model. In an example, the last generated output token is used as the input token for the next inference of the generative model.

During generation of an output token, the generative model computes a first value matrix entry (e.g., value matrix entry $v_n$). In an example, the first value matrix entry is computed based upon the matrix multiplication operation shown in equation 3 as shown above. The first value matrix entry comprises a number of columns and rows based upon a batch size parameter which defines the number of tokens that are processed simultaneously by the generative model. Accordingly, the batch size corresponds to the number of cache lines that are generated per inference of the generative model (e.g., the number of columns of the key matrix entry k) and the number of rows of the value matrix entry $v_n$). For example, for a generative model that processes each output token one token at a time, the batch size=1. As explained above, during the initial processing of an input prompt, the generative model may process a plurality of input tokens simultaneously (e.g., batch size>1) and then processes each new output token individually (e.g., batch size=1).

The first value matrix entry is stored in a first memory of the computing system. In an example, the first memory is a static-random access memory (SRAM). The first memory also stores value matrix entries previously computed during execution of the generative model. For example, with reference to equation 5 above, when storing the first value matrix entry in the first memory, the first value matrix entry is vertically concatenated with results from previous inferences of the generative model. The computing system identifies a first group of value matrix entries stored in the first memory (which is inclusive of the first value matrix and the previously computed value matrix entries) in order to execute data quantization on the first group of value matrix entries. In an example, the first group of value matrix entries corresponds to a group size parameter G which defines the number of elements in a quantization block. For the vertically concatenated V cache, the group size G corresponds to the number of rows in each quantization block.

Block-based quantization involves grouping elements into groups of data or "blocks" which are then quantized to a smaller data format (e.g., from floating point 32 to INT8, INT4, INT2, etc.). Quantization enables the model to perform operations with the quantized values more efficiently (e.g., integer arithmetic is less computationally demanding than floating point arithmetic, etc.) without a substantial reduction in the model's accuracy. In some examples, quantized data blocks share scale and bias factors which can decrease quantization error and make the block more resilient to outlier values. In some examples, a plurality of blocks may be grouped into a super-block. The blocks within a super-block also share an additional scale and bias factor (e.g., super-block scale and super-block bias) in addition to the block-wise scale and bias factor. The use of super-block quantization further decreases quantization error and makes the entire super-block more resilient to outlier values within the super-block. The values within a block (and/or super block) are quantized together in order to maintain consistent scale and bias values.

After identifying the first group of value matrix entries, the computing system executes data quantization on the first group of value matrix entries resulting in a first quantized value matrix. The first quantized value matrix comprises a number of rows equal to the group size (e.g., according to group size parameter G). In an example, each block of data within the first quantized value matrix is quantized according to the same scale and bias values. In another example, each of the blocks within the first quantized value matrix are quantized according to the same super-scale and super-bias values.

The first quantized value matrix is stored in a second memory of the computing system. In an example, the second memory is dynamic random access memory (DRAM). The first quantized value matrix (and/or values therein) is then available to be retrieved from the second memory during execution of the generative model. During generation of the next token, the computing system deletes the first group of value matrix entries stored in the first memory. After the values have been deleted, the computing system identifies remainder value matrix entries remaining in the first memory after the first group of value matrix entries has been deleted. The computing system then generates data padding matrix entries based upon the remainder value matrix entries and optionally stores the data padding matrix values in the first memory. In an example, the data padding matrix entries, when combined with the remainder value matrix entries, are equal to the group size. The values in the data padding matrix are selected so as to not influence the values in the remainder value matrix entries. For example, the data padding matrix values comprise values that are between the minimum and maximum value for a column of the remainder value matrix entries. In one example, the data padding matrix values are the last value in each column of the remainder value matrix entries.

The computing system identifies a second group of value matrix entries comprising the remainder value matrix entries and the data padding matrix entries and executes data quantization on the second group of value matrix entries. The second quantized value matrix is then stored in the second memory to be retrieved during execution of the generative model. In one example, the quantized values corresponding to the data padding matrix are ignored, whereby the generative model uses only the quantized values corresponding to the remainder value matrix entries when generating the next token.

As each new token is generated by the generative model, a new row of the value data matrix is added to the first memory (e.g., displacing a row of the data padding matrix values). In an example, each new row of the value data matrix is vertically concatenated with the remainder value matrix entries and new data padding matrix values are added until a group size is reached in order to execute data quantization on the group. For example, the computing system identifies a third group (e.g., comprising the remainder value matrix entries, the new row of the value data matrix, and the data padding matrix values) and executes data quantization on the third group resulting in a third quantized value matrix. The third quantized value matrix may then be stored in the second memory. In an example, the second quantized value matrix is overwritten within the second memory (as they share values for an overlapping segment of tokens). The above-described data handling process continues until a full group size of computed value matrix values is computed, at which point they may be quantized and stored in the second memory for retrieval during execution of the generative model.

An exemplary computing system implementing the described data handling architecture offers several advantages over conventional technologies when implementing a generative model. For example, the described block-based quantization of value matrix entries improves performance in memory capacity, memory throughput requirements, enables longer context lengths of the generative model, and reduces overall compute latency of the generative model.

The above presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

Various technologies pertaining to data handling optimization for execution of generative models as described herein are now described with reference to the drawings, wherein like reference numerals are used to refer to like elements throughout.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

Described herein are various technologies pertaining to optimization of the data handling architecture of a computing system executing a generative model. More specifically, the technologies described herein are directed towards runtime optimization of the memory storing the Key and Value matrices (collectively referred to as the "KV cache") which are used to retain values for past tokens used by the generative model to generate output. By optimizing the data handling architecture of the computing system executing the generative model, the technologies described herein improve over conventional systems at least by 1) improving memory capacity enabling improved maximum context length of the generative model, 2) reducing operational latency of the model, and 3) increasing memory throughput.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Figure 1:
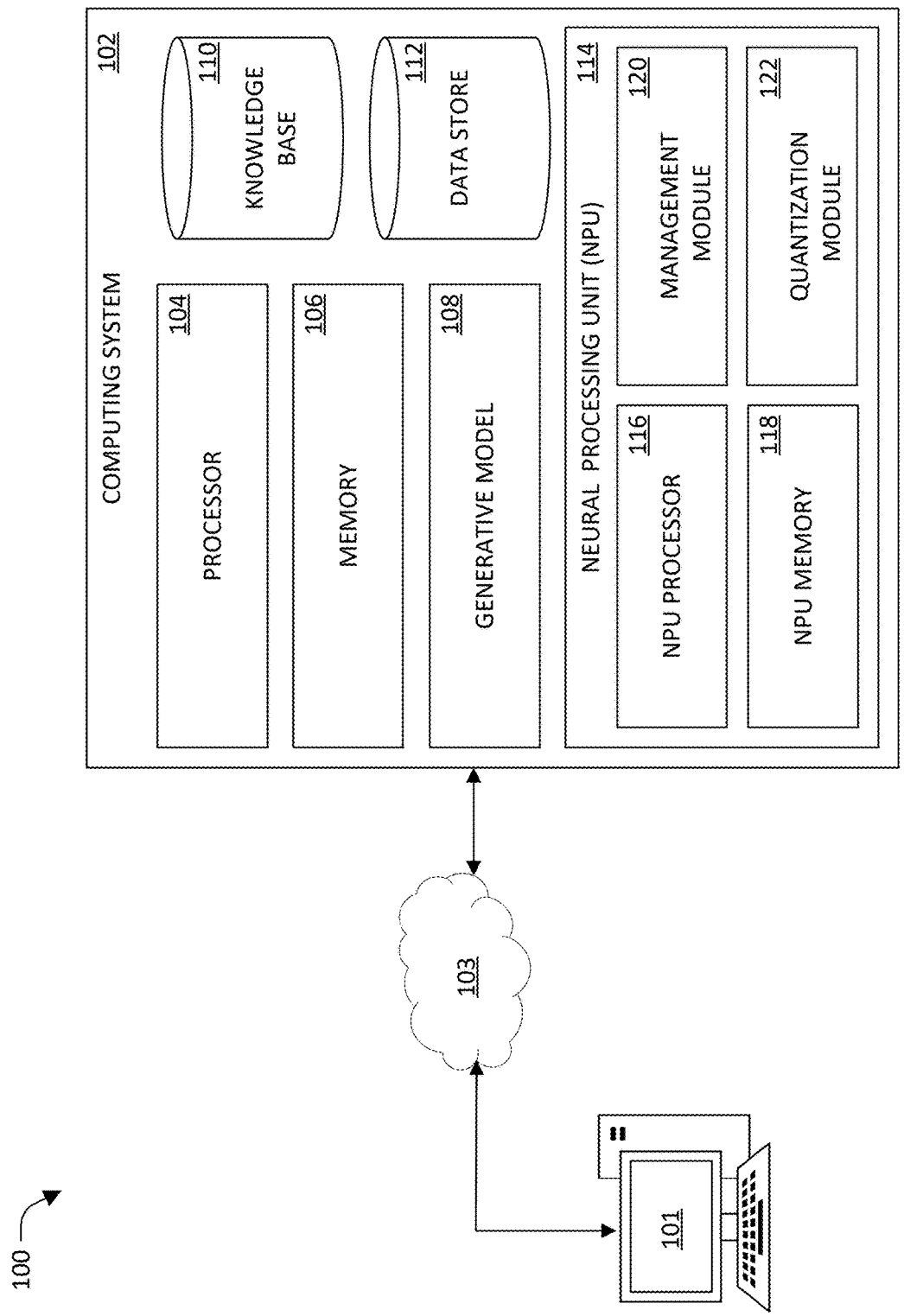
FIG. 1 is a functional block diagram of an example computing system.

With reference to FIG. 1, an example computing environment 100 is illustrated. The computing environment 100 includes a computing system 102. According to some examples, the computing system 102 is a server computing device. According to other examples, the computing system 102 is a cloud-based computing platform. While computing system 102 is depicted as a single computing system, it is appreciated that computing system 102 and its components may be a distributed computing system comprising a plurality of computing systems operably connected over a network (e.g., network 103) and configured to collectively perform the functionality of computing system 102. The computing system 102 is operably connected to a client computing device 101 over network 103 (e.g., the Internet, intranet, or the like).

The computing system 102 includes a processor 104 and memory 106. The processor 104 comprises at least one processor such as a central processing unit (CPU), a graphics processing unit (GPU), or the like. The computing system further comprises a neural processing unit (NPU) 114 which comprises an NPU processor 116 and an NPU memory 118. Processor 104 and NPU processor 116 may be collectively referred to herein as processors of computing system 102. Processor 104 and NPU processor 116 may each include one or more processor cores to process computer-executable instructions, such that, when executed, cause the processor to perform certain functionality as described with reference to computing system 102. In an example, NPU processor 116 comprises at least one of a tensor processor, a vector processor, a scalar processor, or the like. Depending on the application, Processor 104 and NPU processor 116 may be suitable for executing such instructions separately or in combination. In some examples, Processor 104 and NPU processor 116 may execute different sets of instructions and perform operations of computing system 102 concurrently or substantially concurrently.

Computing system 102 comprises memory in the form of memory 106 and NPU memory 116. Memory 106 and NPU memory 116 can be a dynamic random access memory (DRAM) device, a static random access memory (SRAM) device, flash memory device, phase-change memory device, or some other memory device suitable to serve as process memory. In some examples, the memory of computing system 102 (e.g., memory 106 and/or NPU memory 116) stores instructions, that when executed by a processor (e.g., processor 104 and/or NPU processor 116), cause the processor to perform certain operations and/or functionalities associated with computing system 102 and and/or its component parts. NPU memory 118 may be any such memory device suitable to serve as process memory and in some examples, may comprise memories optimized for particular operations performed by NPU 114. In some examples, memory 106 may be shared among processors of computing system 102 (e.g., processor 104 and/or NPU 114) while NPU memory 118 is dedicated for use by NPU 114.

In an example, the memory (e.g., memory 106 and/or NPU memory 116) comprises instructions for executing a generative model 108. In an example, the generative model 108 is a transformer-based language model (e.g., large language model (LLM), small language model (SLM), etc.) such as, for example, Generative Pre-trained Transformer (GPT), Gemini by Google DeepMind, or Large Language Model Meta AI (LLaMa). While generally discussed herein in the context of language models, it is appreciated that the computing system 102 may be utilized in connection with any model where the data handling optimizations described herein are desirable.

The generative model 108 is trained upon training data stored in knowledge base 110. Knowledge base 110 may be communicatively coupled over a network (e.g., network 103) to additional data storage(s) storing data used to train the generative model 108. Computing system 102 further comprises data store 112 which is a non-volatile storage for use in connection with computing system 102.

The generative model 108 may be executed by the processors of computing system 102 (e.g., processor 104 and/or NPU processor 116). In an example, the NPU 114 is configured specifically to perform operations in connection with execution of generative model 108. For example, NPU 114 comprises management module 120 and quantization module 122. Management module 120 manages execution of various operations performed by the NPU 114. In an example, management module 120 is configured to control inference execution flow of generative model 108.

NPU 114 further comprises quantization module 122. Quantization module 122 is configured to perform data quantization operations on data used by computing system 102, for example, during execution of generative model 108. In an example, quantization module 122 performs block-based data quantization. Block-based quantization involves grouping data elements into groups of data or "blocks" which are then quantized to a smaller data format (e.g., from floating point 32 to INT8, INT4, INT2, etc.). Quantization enables computing system 102 to perform operations with the quantized values more efficiently (e.g., integer arithmetic is less computationally demanding than floating point arithmetic, etc.) without a substantial reduction in computational accuracy.

Figure 2:
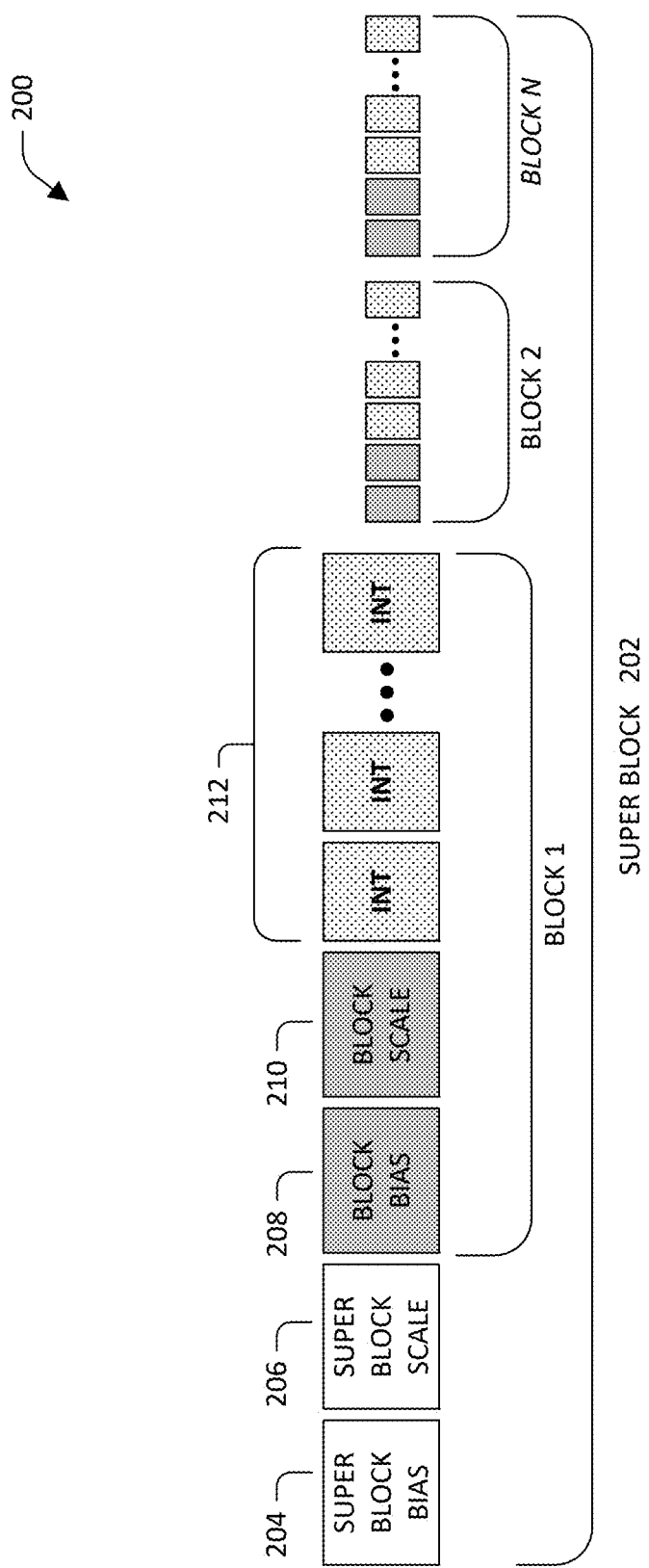
FIG. 2 is an exemplary representation of a super-block quantization format.

With reference to FIG. 2, and exemplary block-based quantization format 200 is illustrated. The quantization format 200 employs a super block quantization format which comprises a super block 202. Super block 202 comprises a plurality of data blocks (e.g., data block 1, data block 2, data block n). In some examples, quantized data blocks share scale and bias factors which can decrease quantization error and make the quantization more resilient to outlier values within each block. For example, super block 202 uses a super block bias factor 204 and a super block scale value 206. The super block bias factor 204 and a super block scale value 206 are applied to all blocks in the super block to maintain consistency within the super block 202. Each block may also have its own scale and bias factors. For example, block 1 uses block bias 208 and block scale 210. The values within a block (e.g., integer values 212) are quantized together in order to maintain consistent values according to the scale and bias factors (e.g., super block bias 204, super block scale 206, block bias 208, block scale 210, etc.). In some examples, the number of quantized values in a block corresponds to a group size parameter G.

As will be described in greater detail below, the computing system 102, by way of NPU 114, is generally configured to perform operations during execution of generative model 108, performing at least the following: (1) computing a first value matrix entry; (2) storing the first value matrix entry in a first memory (e.g., NPU memory 118), wherein the first memory stores value matrix entries computed during execution of the generative model 108; (3) identifying a first group of value matrix entries stored in the first memory, wherein the value matrix entries stored in the first memory are greater than or equal to a group size parameter; (4) executing data quantization on the first group of value matrix entries, wherein the data quantization produces a result comprising a first quantized value matrix comprising a plurality of quantization block values; (5) storing the first quantized value matrix in a second memory (e.g., memory 106); and (6) retrieving the first quantized value matrix from the second memory during execution of the generative model 108.

In some examples, the computing system 102 (e.g., by way of NPU 114) is further configured to perform the following additional operations during execution of the generative model: (7) deleting the first group of value matrix entries stored in the first memory; (8) identifying one or more remainder value matrix entries remaining in the first memory subsequent to deleting the first group of value matrix entries; (9) generating one or more data padding matrix entries based upon the remainder value matrix entries; (10) storing the one or more data padding matrix entries in the first memory; (11) identifying a second group of value matrix entries stored in the first memory, wherein the second group of value matrix entries comprises the one or more remainder value matrix entries and the one or more data padding matrix entries; (12) executing data quantization on the second group of value matrix entries, wherein the data quantization produces a result comprising a second quantized value matrix; (13) storing the second quantized value matrix in the second memory; and (14) retrieving the first quantized value matrix and the second quantized value matrix from the second memory during execution of the generative model.

Execution of the above-described acts improves the performance of the generative model executed by computing system 102 by reducing latency and overall consumption of memory resources during execution of a generative model (e.g., generative model 108).

Exemplary operation of the computing system will now be described with reference to FIGS. 1 and 3. In exemplary operation, the computing system 102 is configured to execute a pre-trained generative model, generative model 108. In some examples, the generative model 108 is a transformer-based language model. The generative model 108 is trained upon data obtained from knowledge base 114. Generative model 108 is configured to receive an input (e.g., an input set forth by a user of a client computing device 101 in network communication (e.g., by way of network 103) with computing system 102) and generate a responsive output based upon the input.

During execution of generative model 108, NPU 114 performs certain operations associated with execution of the generative model 108. In an example, the management module 120 of NPU 114 is configured to control the execution flow of the generative model 108. Responsive to the generative model 108 receiving an input (e.g., by way of client computing device 101), NPU 114 processes input tokens provided as input into generative model 108. Execution of the generative model 108 can be broken in to two stages of inferencing, the prompt stage and the autoregressive stage. In the prompt stage, the input prompt is analyzed by the model and tokens are processed (e.g., by way of NPU 114) in batches>1 (e.g., 128 tokens, 256 tokens, 512 tokens, etc.). As the tokens are processed, values associated with the processed tokens are stored in memory (e.g., memory 106 and/or NPU memory 118). During the autoregressive stage, the values for the previous tokens are retrieved from memory and used to compute the next output token. Each new output token is generated based upon the prior token values stored in memory.

As described herein, the portion of memory used to retain computed values for previously processed tokens is called the KV cache. Use of the KV cache is optimized by computing system 102 way of executing data quantization on the data stored in the KV cache. In an example, when an input $x_n$ is entered into a decoder of the generative model 108, the input is split to the multiple heads of the decoder, then undergoes a matrix multiplication operation with three weight matrices, shown below in equations 1-3:

$$q_n = x_n \cdot W_Q \quad (1)$$

$$k_n = x_n \cdot W_K \quad (2)$$

$$v_n = x_n \cdot W_V \quad (3)$$

Afterward, the generative model 108 causes the key matrix entry $k_n$ to be transposed and stored in memory (e.g., NPU memory 118) as part of the K cache. The values of the key matrix entry $k_n$ are horizontally concatenated with K results from previous inferences of the generative model according to equation 4:

$$K_n^T = [K_{n-1}^T \mid k_n^T] \quad (4)$$

Because each new key matrix entry $k_n$ added to the K cache is horizontally concatenated, each newly computed value corresponds to a new column of the $K_n^T$ matrix. In one example, quantization module 122 executes data quantization on each column of the K cache. The quantized values of the K cache are stored in memory 106 where they can be retrieved during computation of the next token.

Generative model 108 causes the value matrix entry $v_n$ to be stored in memory (e.g., NPU memory 118) as part of the V cache. The values of the value matrix entry $v_n$ are vertically concatenated with V results from previous inferences of the generative model according to equation 5:

$$V_n = \begin{bmatrix} V_{n-1} \\ v_n \end{bmatrix} \quad (5)$$

The values stored in the KV cache (the resultant K and V matrices) are fetched by the generative model during computation during the next stage of self-attention by the generative model according to equation 6:

$$y_n = \text{Softmax}\left(\frac{q_n \cdot K_n^T}{\sqrt{d_k}}\right) \cdot V_n \qquad (6)$$

The values stored in the KV cache are retrieved by generative model 108 column by column. As explained above, the K cache is generated and stored column by column so columns of key matrix values can be quantized (e.g., by way of quantization module 122) individually without further processing. However, retrieving values from the V matrix creates an issue with respect to how data quantization can be applied to the KV cache. For example, because the V cache is vertically concatenated, each new value matrix un is added to the V cache row by row. Quantization of the V cache must be performed using blocks that divide the V cache columns so that they can be fetched column by column during execution of the generative model 108.

Referring now to FIGS. 3A-M, exemplary data quantization of V cache data is illustrated. In FIG. 3A, an exemplary value matrix entry 300 is shown. The value matrix entry 300 comprises data values computed during processing of input tokens provided as input into generative model 108. The value matrix entry 300 comprises a number of columns and rows based upon a batch size parameter B which defines the number of tokens that are processed simultaneously by the generative model 108. Accordingly, the batch size B corresponds to the number of cache lines that are generated per inference of the generative model 108 (e.g., the number of columns of the key matrix value $k_n$ and the number of rows of the value matrix entry $v_n$). As explained above, during the initial processing of an input prompt, the generative model 108 may process a plurality of input tokens simultaneously (e.g., batch size>1) and then processes each new output token individually (e.g., batch size=1).

Figure 3B:
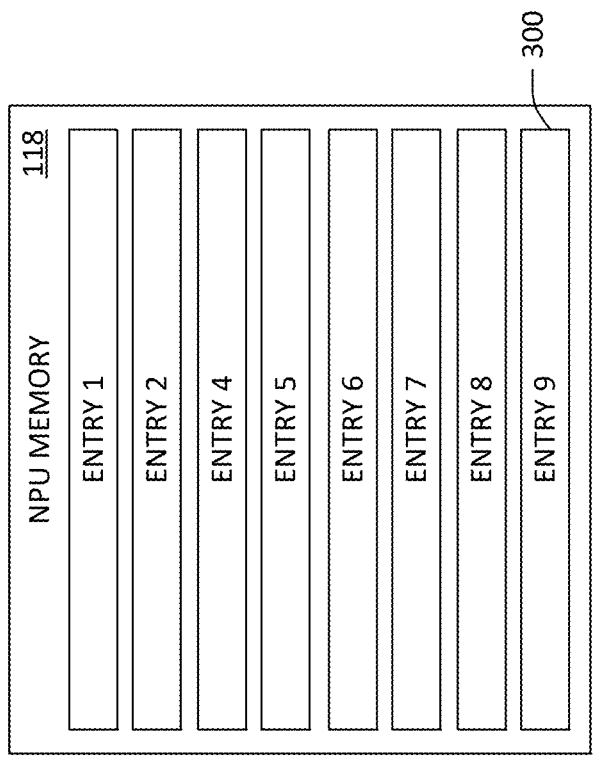
FIGS. 3A-M illustrate exemplary operation of the computing system of FIG. 1.
Figure 3A:
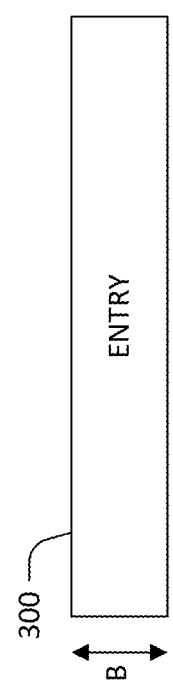

In FIG. 3B, the value matrix entry 300 is shown vertically concatenated to existing data stored in NPU memory 118. In an example, NPU memory 118 is SRAM. SRAM has certain advantages over DRAM. Firstly, SRAM is faster than DRAM. This enables the computing NPU 114 to efficiently fetch values from the SRAM to perform data quantization tasks. Additionally, SRAM requires less power consumption than DRAM which further reduces the resources needed to execute the generative model 108. Furthermore, the NPU memory 118 is dedicated memory (as opposed to shared memory used throughout the computing system 102) which enables further efficiencies when using the NPU memory data quantization tasks.

Turning back to FIG. 3B, entries 1-8 are representative of prior value matrix entries computed during execution of generative model 108. Each new value matrix entry computed during processing of the next output token is vertically concatenated with the prior computed value matrix entry. In an example, value matrix entries are computed based upon the matrix multiplication operation shown in equation 3 (as shown above).

Figure 3D:
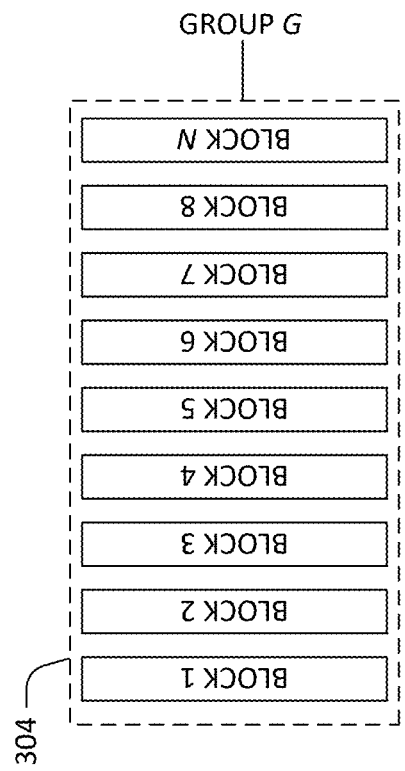
Figure 3C:
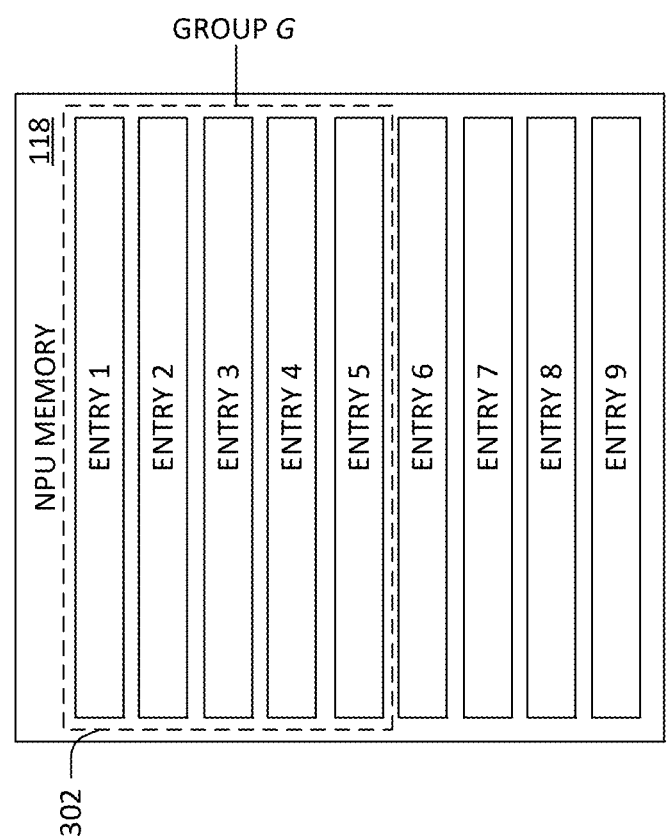

Continuing with the above example, as depicted in FIG. 3C, the computing system 102 identifies a first group G comprising value matrix entries 302 stored in the NPU memory 118 in order to perform quantization on the first group of value matrix entries 302. In an example, the first group of value matrix entries 302 corresponds to a group size parameter G which defines the number of elements in a quantization grouping.

After identifying the first group of value matrix entries 302, the computing system 102 executes data quantization on the first group of value matrix entries 302. In an example, computing system 102 (by way of quantization module 122) quantizes the values in the first group of value matrix entries 302 from a floating point format (e.g., FP32, FP16, etc.) to an integer format (INT8, INT4, INT2, etc.). As shown in FIG. 3D, a first quantized value matrix 304 is formed based upon the quantized data of the first group of value matrix entries 302. The first quantized value matrix 304 comprises a number of rows equal to the group size (e.g., according to group size parameter G). In an example, each block of data within the first quantized value matrix 304 is quantized according to the same scale and bias values. In another example, each of the blocks within the first quantized value matrix 304 are quantized according to the same super-scale and super-bias values (where a superblock data quantization scheme is used). The values within the quantized value matrix 304 are quantized into column-wise blocks to accommodate retrieval during execution of generative model 108 (which retrieves values column by column during execution).

Figure 3E:
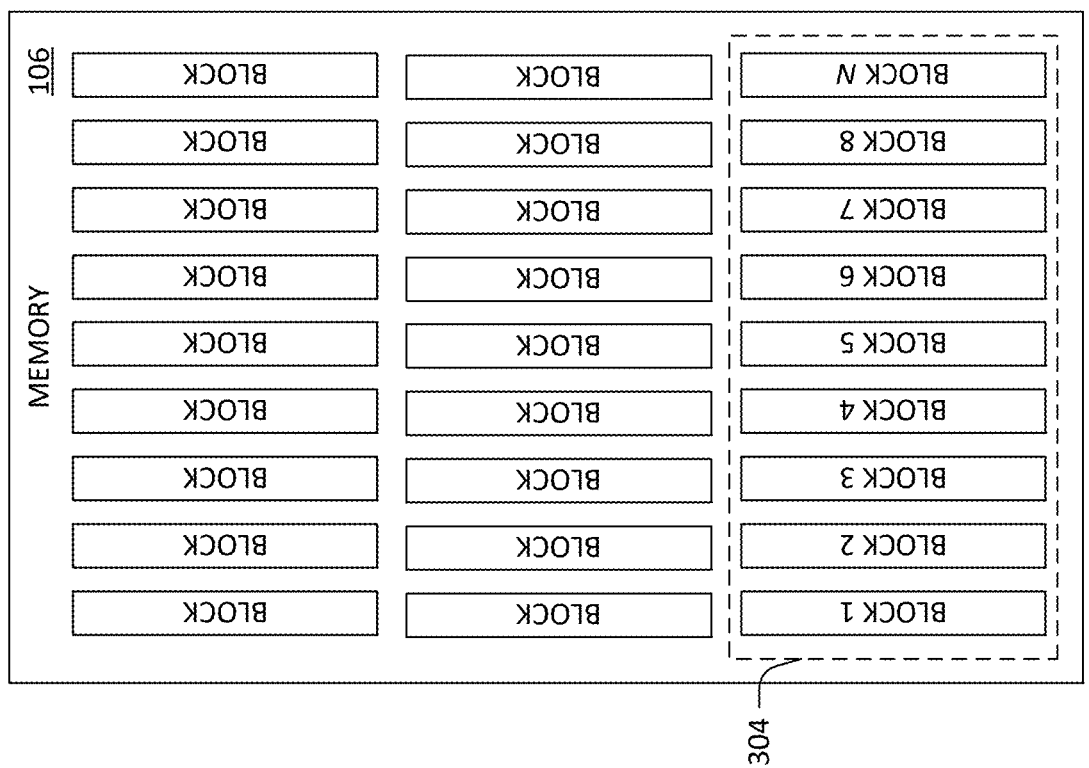

As shown in FIG. 3E, the values from the first quantized value matrix 304 are stored in memory 106 of the computing system 102. In some examples, the memory 106 already contains quantized data blocks from prior computed tokens. For quantized data blocks that are incomplete or "temporary" quantized data blocks, the values of the first quantized value matrix 304 may overwrite such data in memory 106. Upon storing in the memory 106, the first quantized value matrix 304 (and/or values therein) is available to be retrieved from memory 106 during execution of the generative model 108. As explained above, in some examples, the entire V cache is retrieved during processing of each subsequent token generated by the generative model 108. In some examples, the memory 106 is dynamic random access memory (DRAM).

During inference of the next token, the computing system 102 deletes the first group of value matrix entries 302 stored in the NPU memory 118. As shown in FIG. 3F, the values corresponding to the first group of value matrix entries 302 (e.g., entries 1-5) have been deleted from NPU memory 118. The remainder value matrix entries 306 is the data remaining in the NPU memory 118 after the deletion of the first group of value matrix entries 302. The remainder data needs to be quantized to maintain consistency with the prior quantized value matrix data stored in memory 106 when retrieved during execution of generative model 108; however, the number of values in the remainder value matrix entries 306 is less than the group size required to perform data quantization.

Figure 3G:
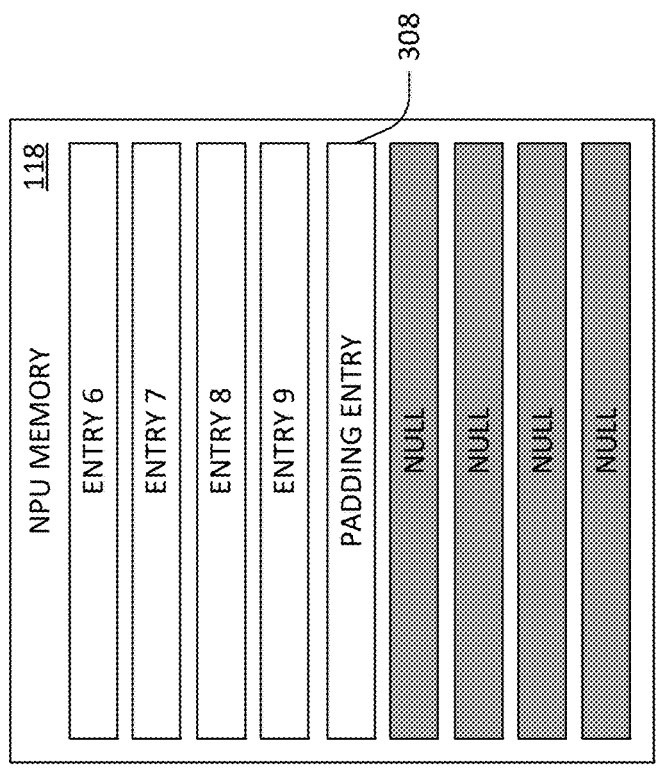
Figure 3F:
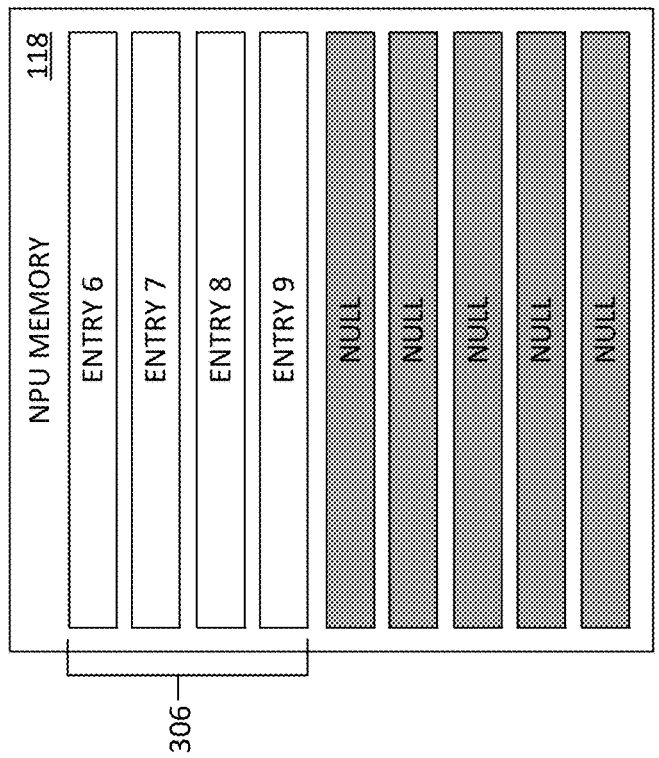

In FIG. 3G, the computing system 102 generates data padding matrix entries 308 based upon the remainder value matrix entries 306 in order to execute data quantization on a full quantization block according to the group size parameter G. In some examples, the computing system 102 stores the data padding matrix entries 308 in NPU memory 118. In some examples, the data padding matrix entries 308 are generated concurrently with execution of data quantization and are not stored in NPU memory 118.

In an example, the data padding matrix entries 308, when combined with the remainder value matrix entries 306, are equal to the group size G. For example, the number of rows of padding data generated as part of the data padding matrix entries 308 is equal to the number of additional rows needed to fill a group size (e.g., as shown in FIG. 3G, the group size=5, and there are 4 remainder value matrix entries so only one additional row of padding data is generated to fill the group). The values in the data padding matrix are generated so as to not influence the values in the remainder value matrix entries 306 when the group is quantized. For example, the data padding matrix entries 308 comprise values that are between the minimum and maximum value within a column of the remainder value matrix entries 306. In one example, the data padding matrix values 308 duplicate the last value in each column of the remainder value matrix entries 306. It is appreciated that the above indicated group size is offered by way of example only, and that group size utilized by computing system 102 may vary according to various factors, including, but not limited to, available computing resources, configuration of computing system 102, configuration of generative model 108, etc.

Figure 3H:
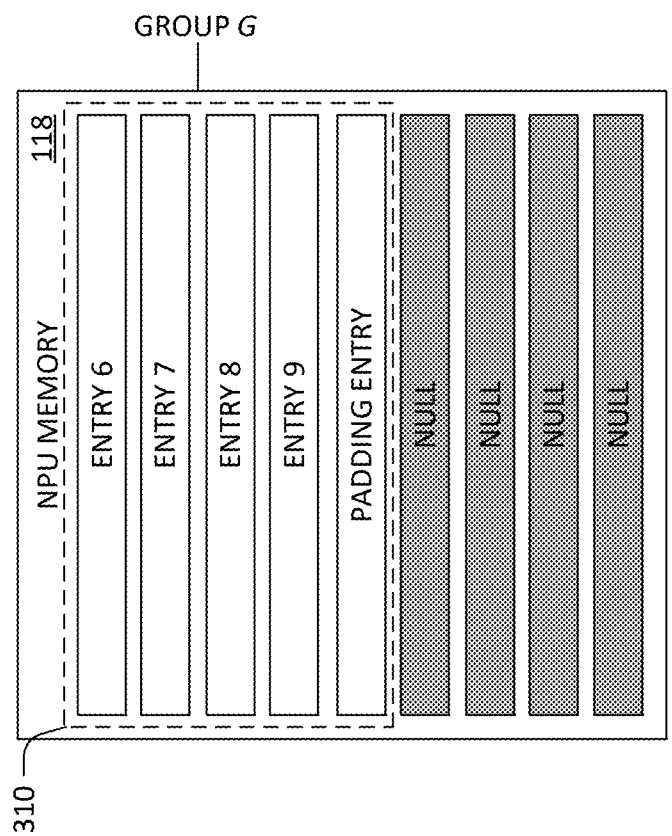
Figure 3I:
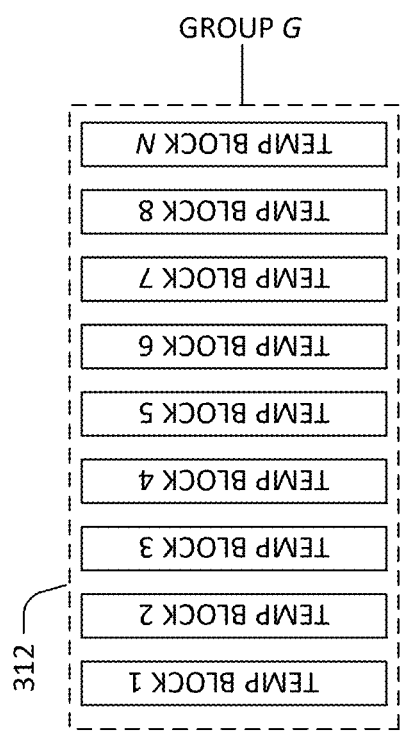

As shown in FIG. 3H, the computing system 102 identifies a second group of value matrix entries 310 comprising the remainder value matrix entries 306 and the data padding matrix entries 308 and executes data quantization on the second group of value matrix entries 310. In some examples, the identification of the second group of value matrix entries is performed concurrently with execution of the data quantization. An exemplary second quantized value matrix 312 is shown in FIG. 3I. The second quantized value matrix 312 comprises a number of rows equal to the group size (e.g., according to group size parameter G).

In an example, each block of data within the second quantized value matrix 312 is quantized according to the same scale and bias values as the first quantized value matrix 304. In another example, each of the blocks within the second quantized value matrix 310 are quantized according to the same super-scale and super-bias values as the first quantized value matrix 304 (where a superblock data quantization scheme is used). As with the first quantized value matrix 304, the values within the second quantized value matrix 312 are quantized into column-wise blocks to accommodate retrieval during execution of generative model 108 (which retrieves values column by column during execution). In some examples, because the second quantized value matrix 312 comprises padding values it is also referred to as a "temporary" quantization group because the padding values will be overwritten as new token values (e.g., new value matrix rows) are computed.

Figure 3J:
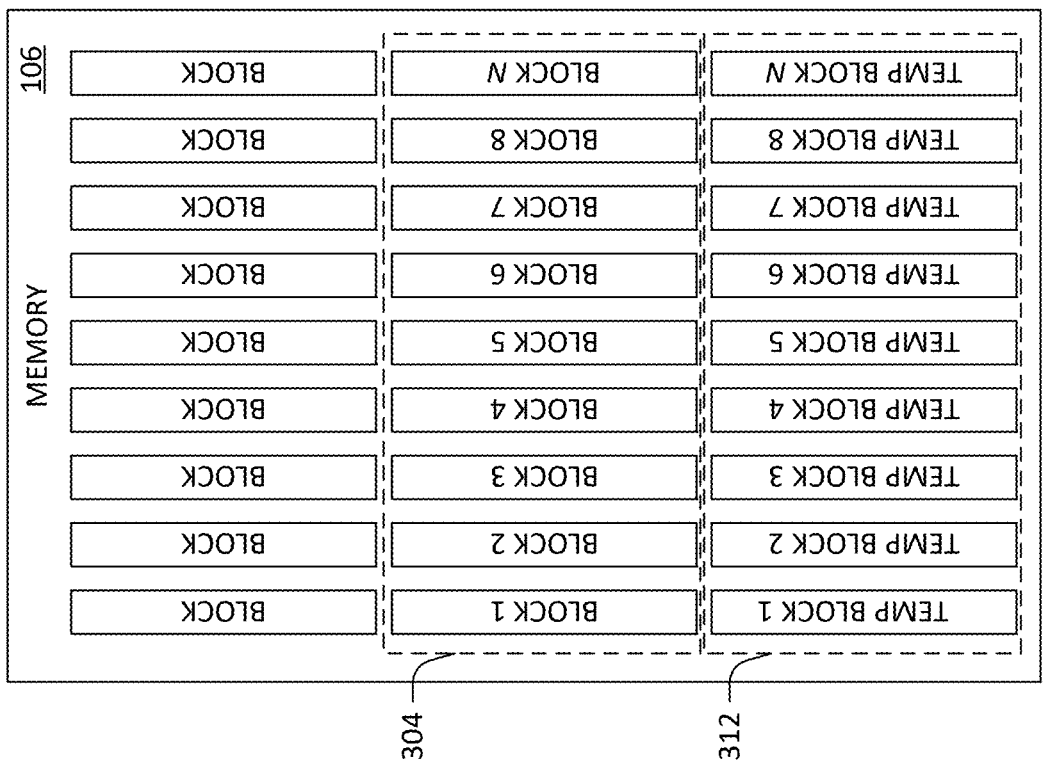

As shown in FIG. 3J the second quantized value matrix 312 is stored in memory 106 (along with the first quantized value matrix 304) to be retrieved during execution of the generative model 108. In one example, the quantized values corresponding to the data padding matrix entries 308 are ignored, whereby the generative model 108 uses only the quantized values (along with the prior computed quantized data blocks stored in memory 106) corresponding to the remainder value matrix entries 306 when generating the next token.

As each new token is generated, a new row of the value data matrix is added to the NPU memory 118 (e.g., displacing a row of the data padding matrix values). In an example, each new row of the value data matrix is vertically concatenated with the remainder value matrix entries 306 and new data padding matrix values are added until a group size is reached. In one example, data padding matrix entries 308 are generated during processing of a first token, and for each new token, a data padding matrix entry is deleted from NPU memory 118 (e.g., the data padding matrix entry vertically concatenated to the last computed value matrix entry) and the new row of the value data matrix is stored in its place. In another example, the data padding matrix entries 308 are deleted from NPU memory 118 after data quantization has been performed on a group containing the data padding matrix entries 308. New data padding matrix entries 308 may then be generated as necessary during generation of the next token.

Figure 3L:
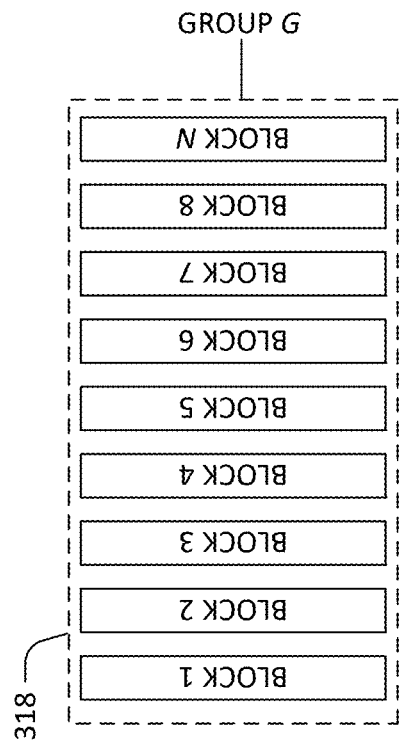
Figure 3K:
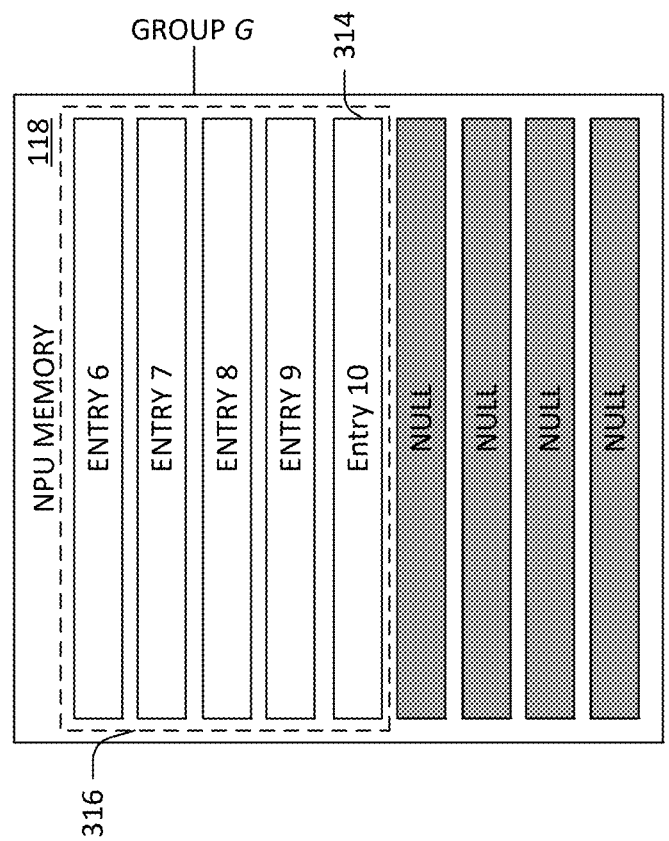
Figure 3M:
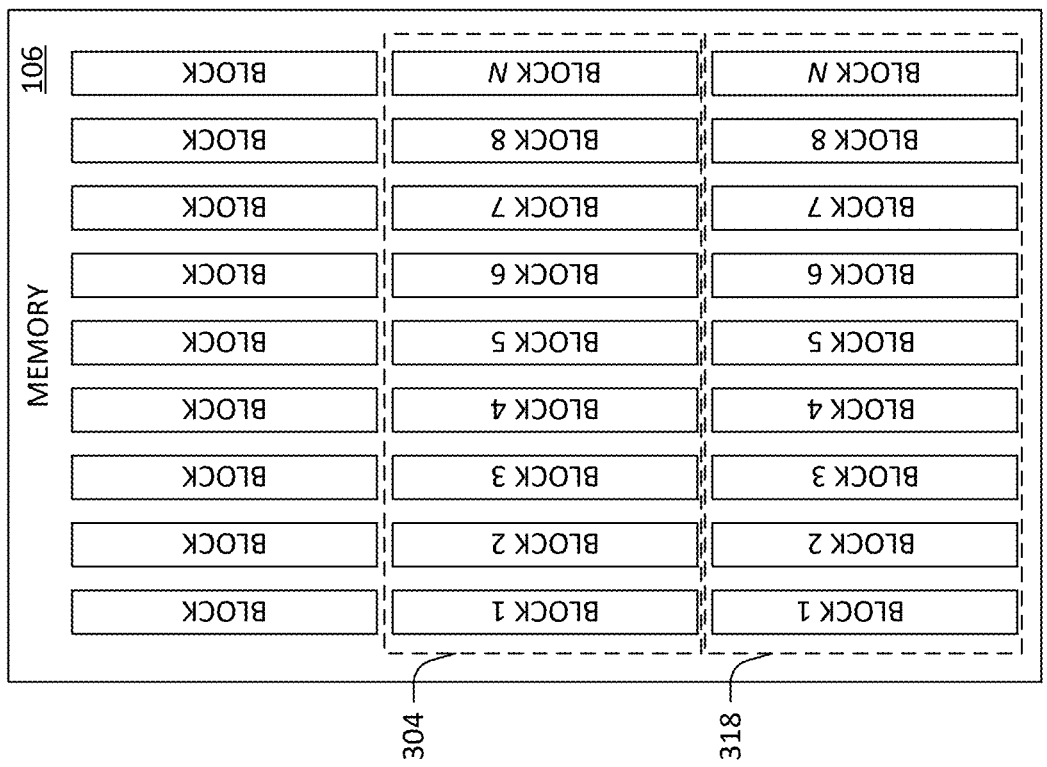

In FIG. 3K, a value matrix entry 314 is added to NPU memory 118. Value matrix entry 314 corresponds to the last computed token during execution of the generative model 108. In an example, the addition of value matrix entry 314 to the remainder value matrix entries 308 enables computing system 102 to identify value matrix entries 316 which comprise a full quantization group (e.g., according to group parameter G) within NPU memory 118. In FIG. 3L, the value matrix entries 316 are quantized resulting in a third quantized value matrix 318. In FIG. 3M, memory 106 is shown storing the first quantized value matrix 304 and the third quantized value matrix 318, where the quantized values may be retrieved during execution of generative model 108. In some examples, the second quantized value matrix 312 is overwritten from memory 106 and replaced by the third quantized value matrix 318 (as they share values for an overlapping segment of tokens).

The above described operation of computing system 102 has several advantages over conventional systems. Specifically, in an example where NPU memory 118 is SRAM and memory 106 is DRAM, the DRAM capacity overhead needed during execution of generative model 108 is reduced. For example, for a group size G, the maximum number of overwritten V cache rows per inference is G-1. In an example, for a generative model with 7 billion parameters (e.g., 7 billion weights) the width of each V cache row (e.g., value matrix entry $v_n$) is equal to the model's key dimension, which in this example is 128 (e.g., 32 heads and 32 decoders). Accordingly, in an example, V cache is quantized to an INT8 value per element, with a block size of 16 elements with a scale format of FP16 (16 bit) and no bias, and a super block size of 128 elements (8 blocks) with a scale format of FP16 and no bias. Therefore, since group size G is 128, the maximum number of overwritten V cache rows is 127 (e.g., G-1).

For the above example, the approximate size of the additional DRAM overhead needed to overwrite the padded matrix values for each new token is ~19 MB which is negligible compared to model size and KV cache size being fetched during each inference of the generative model 108. The DRAM access overhead is also significantly smaller than the amount of DRAM capacity that is saved by using quantized KV cache data (which can be GBs or more). In some examples, DRAM access overhead is eliminated if the temporary quantized value matrix entries are stored in the SRAM (e.g., NPU memory 118) and obtained by the generative model from SRAM during execution of the generative model 108.

Exemplary operation of computing system 102 is further explained through the following illustrative examples:

Example 1—Prompt Stage, Batch Size=128 and Group Size=32

Example 1 illustrates prompt stage processing for a batch size 128 that is an integer multiplication of the quantization group size. In an example, responsive to input into the generative model 108 (e.g., input set forth by a user of client computing device 101) the computing system 102 causes processing of the input tokens. During the prompt stage, the generative model 108 is configured to process tokens according to a batch size of 128, meaning that the generative model 108 will process 128 tokens at a time. For the first batch of 128 tokens, the generative model 108 generates a value matrix comprising 128 rows, represented as [1:128]. The generated value matrix [1:128] is stored in NPU memory 118.

NPU 114 (e.g., by way of quantization module 122) executes block quantization of rows [1:32] of the value matrix stored in NPU memory 118 (e.g., SRAM). The quantized values of rows [1:32] are then transferred to memory 106. Rows [1:32] are deleted from NPU memory 118. NPU 114 next executes block quantization of rows [33:64] of the value matrix. The quantized values of rows [33:64] are then transferred to memory 106 (e.g., DRAM) and rows [33:64] are deleted from NPU memory 118. NPU 114 next executes block quantization of rows [65:96] of the value matrix. The quantized values of rows [65:96] are then transferred to memory 106 and rows [65:96] are deleted from NPU memory 118. NPU 114 next executes block quantization of rows [97:128] of the value matrix. The quantized values of rows [97:128] are then transferred to memory 106 and rows [97:128] are deleted from NPU memory 118 which completes processing of the first batch of tokens.

Example 2—Prompt Stage, Batch Size=100 and Group Size=32

Example 2 illustrates prompt stage processing for a batch size that is not an integer multiplication of the quantization group size. In an example, responsive to input into the generative model 108 (e.g., input set forth by a user of client computing device 101) the computing system 102 causes processing of the input tokens according to a batch size of 100, meaning that the generative model 108 will process 100 tokens at a time. For the first batch of 100 tokens, the generative model 108 generates a value matrix comprising 100 rows, represented as [1:100]. The generated value matrix [1:100] is stored in NPU memory 118.

NPU 114 (e.g., by way of quantization module 122) executes block quantization of rows [1:32] of the value matrix stored in NPU memory 118 (e.g., SRAM). The quantized values of rows [1:32] are then transferred to memory 106. Rows [1:32] are then deleted from NPU memory 118. NPU 114 next executes block quantization of rows [33:64] of the value matrix. The quantized values of rows [33:64] are then transferred to memory 106 (e.g., DRAM) and rows [33:64] are deleted from NPU memory 118. NPU 114 next executes block quantization of rows [65:96] of the value matrix. The quantized values of rows [65:96] are then transferred to memory 106 and rows [65:96] are deleted from NPU memory 118. Next, the NPU 114 performs temporary block quantization on rows [97:100] wherein an additional 28 rows of data padding matrix entries are added. The additional data padding matrix entries allow the NPU 114 to quantize a full group size of 32 values. The quantized values of rows [97:100] and the data padding matrix entries are stored in memory 106. In some examples, the quantized data padding matrix entries are ignored by computing system 102 when executing generative model 108.

For a second batch of input tokens, the generated value matrix [101:200] is stored in NPU memory 118 (overwriting any data padding matrix values stored in NPU memory 118). At this point, the NPU memory 118 stores value matrix entries [97:200]. Next, NPU 114 (e.g., by way of quantization module 122) executes block quantization of rows [97:128] of the value matrix stored in NPU memory 118. The quantized values of rows [97:128] are then transferred to memory 106 and any temporary quantized values are over-written. Rows [97:128] are then deleted from NPU memory 118. NPU 114 next executes block quantization of rows [129:160] of the value matrix. The quantized values of rows [129:160] are then transferred to memory 106 and rows [129:160] are deleted from NPU memory 118. NPU 114 next executes block quantization of rows [161:192] of the value matrix. The quantized values of rows [161:192] are then transferred to memory 106 and rows [161:192] are deleted from NPU memory 118. Next, the NPU 114 performs temporary block quantization on rows [193:200] wherein an additional 24 rows of data padding matrix entries are added. The additional data padding matrix entries allow the NPU 114 to quantize a full group size of 32 values. The quantized values of rows [193:200] and the data padding matrix entries are stored in memory 106. In some examples, the quantized data padding matrix entries are ignored by computing system 102 when executing generative model 108.

The above steps can continue to process the input tokens according to the batch size. For example, for a third batch of input tokens, the generated value matrix [201:300] is stored in NPU memory 118 (overwriting any data padding matrix values stored in NPU memory 118). For each additional batch of input tokens, the amount of data padding needed to quantize full blocks decreases until no data padding is needed and a full block can be quantized without padding data. For example, in the above example, after the 8th batch of 100 input tokens, the last group of rows [769:800] can be quantized without padding.

Example 3—Autoregressive Stage, Batch Size=1 and Group Size=32

Example 3 illustrates autoregressive stage processing for an input size of 1000 tokens. The batch size of 1 corresponds to processing each output token one at a time, wherein each new token is based upon each of the prior tokens. In an example, responsive to an input into the generative model 108 of 1000 tokens (e.g., the input set forth by a user of client computing device 101) the generative model 108 processes the input tokens (e.g., according to the processes outlined above with respect to Examples 1 and 2) and generates a V cache comprising rows [1:1000] of quantized value matrix entries in memory 106. Since the group size is 32, the last 8 rows [993:1000] of entries are temporary quantized values (e.g., quantized using data padding matrix entries).

For the first output token, a new value matrix entry is generated (e.g., row [1001]) and stored at NPU memory 118 (which contains values for rows [993:1000]). NPU 114 executes block quantization of rows [993:1001] of the value matrix using data padding matrix entries for 23 rows (to reach group size 32). The quantized values of rows [993:1001] (and the quantized data padding matrix entries) are then transferred to and stored in memory 106.

For the second output token, a new value matrix entry is generated (e.g., row [1002]) and stored at NPU memory 118 (which contains values for rows [993:1001]). NPU 114 executes block quantization of rows [993:1002] of the value matrix using data padding matrix entries for 22 rows (to reach group size 32). The quantized values of rows [993:1002] (and the quantized data padding matrix entries) are then transferred to and stored in memory 106, where the prior temporary quantized data is overwritten.

The above process is repeated for each new output token. Upon generating the 24$^{th}$ token (e.g., corresponding to row [1024], a full group size can be quantized without the need for data padding. Quantized data for rows [993:1024] is stored in memory 106. It is appreciated that upon storage in memory 106, the quantized data for rows [993:1024] will not be overwritten during subsequent token processing since rows [993:1024] is representative of a full quantization block. For the 25th token, temporary quantization again is necessary to reach a full quantization group. Each successive output token will undergo temporary quantization until the next full quantization group (e.g., 32 value matrix entries) can be added to memory 106.

Figure 4A:
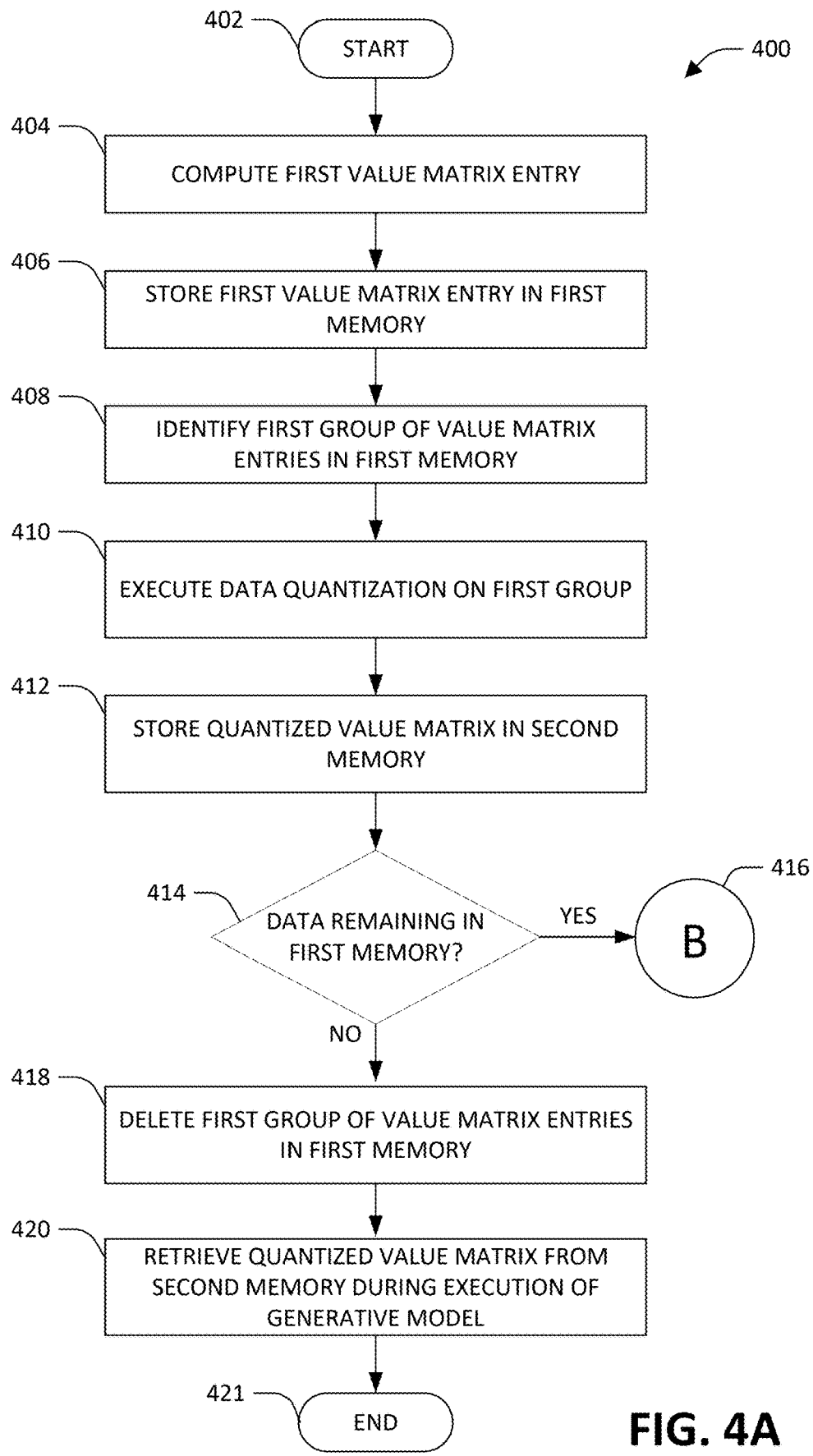
FIGS. 4A-B are a flow diagram that illustrates an example methodology for data handling optimization for generative models.
Figure 4B:
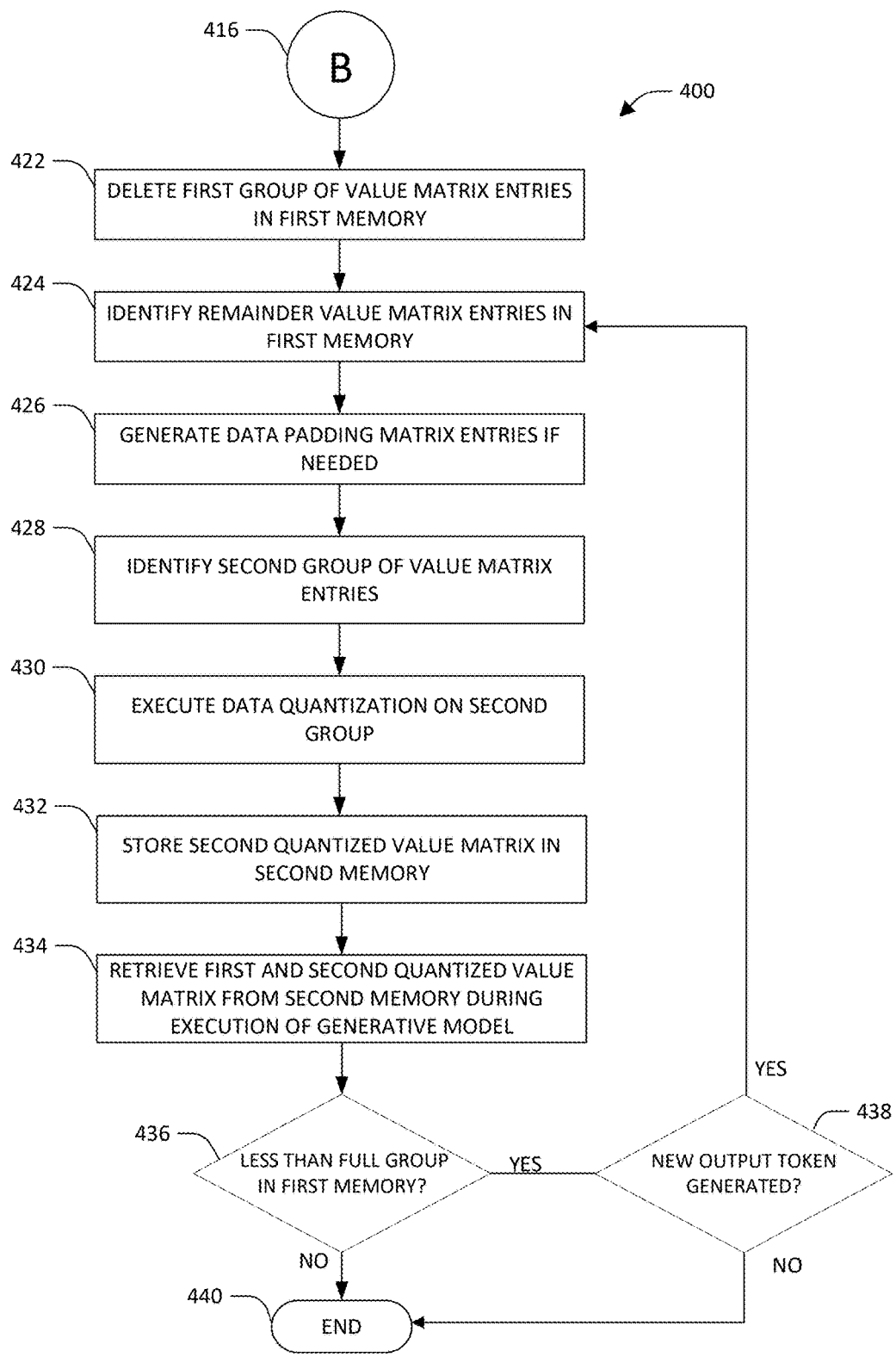
Figure 5:
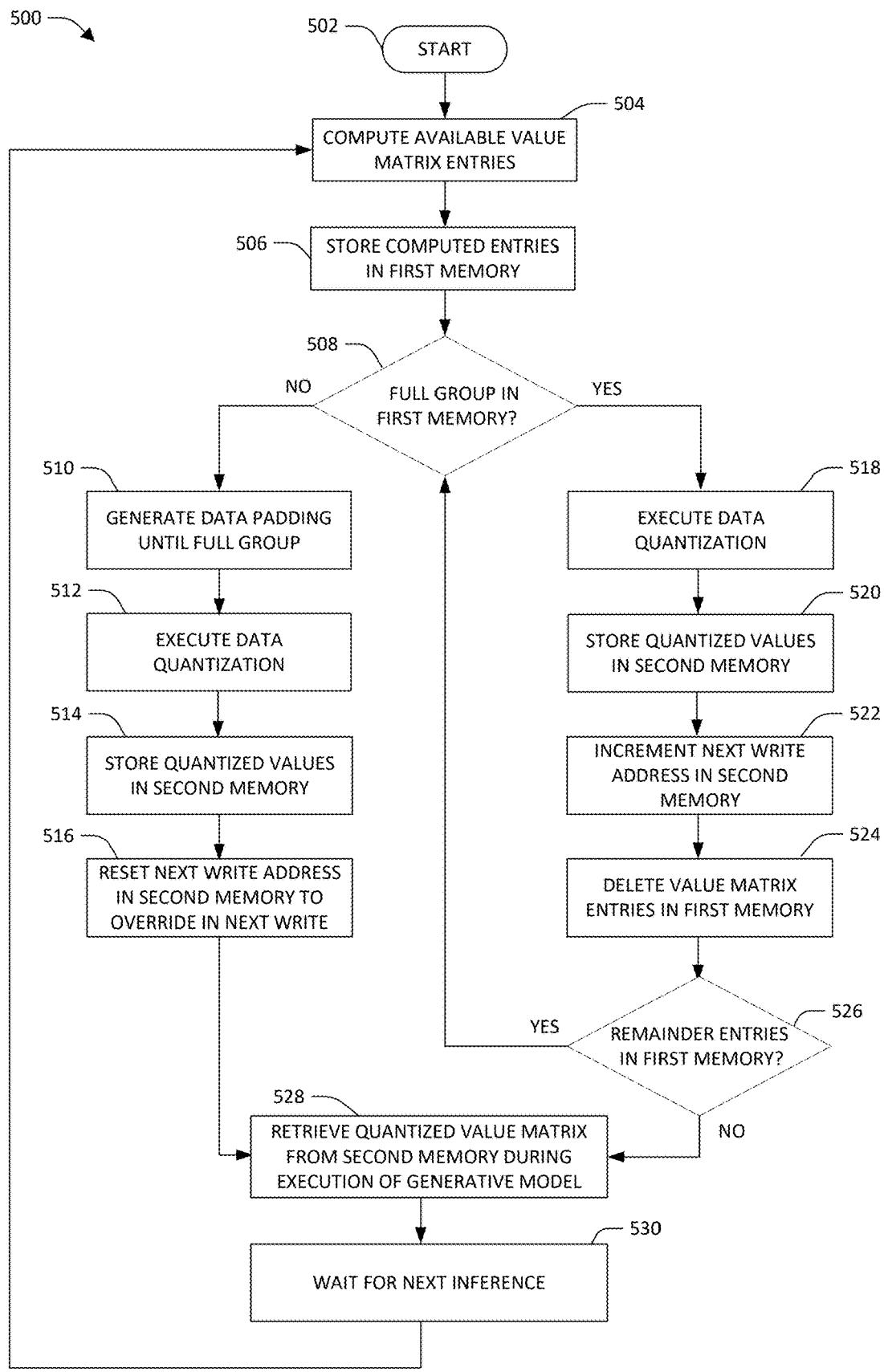
FIG. 5 is a flow diagram that illustrates another example methodology for data handling optimization for generative models.

FIGS. 4A-B and 5 illustrate example methodologies for runtime data quantization during execution of a generative model. While the exemplary methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies as described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 4A, an example methodology 400 for runtime data quantization during execution of a generative model is illustrated. The methodology starts at step 402. At step 404, a first value matrix entry (e.g., value matrix entry $v_n$) is computed. In an example, the first value matrix entry is computed based upon the matrix multiplication operation shown in equation 3 as shown above. The first value matrix entry comprises a number of columns and rows based upon a batch size parameter which defines the number of tokens that are processed simultaneously by the generative model. Accordingly, the batch size corresponds to the number of cache lines that are generated per inference of the generative model.

At step 406, the first value matrix entry is stored in a first memory. In an example, the first memory is a static-random access memory (SRAM) of NPU memory 118. The first memory also stores value matrix entries previously computed during execution of the generative model (e.g., generative model 108). For example, when storing the first value matrix entry in the first memory, the first value matrix entry is vertically concatenated with results from previous inferences of the generative model.

At step 408, a first group of value matrix entries identified. For example, the first group of value matrix entries is identified based upon a group size parameter G which defines the number of rows of data in a quantization block. It is appreciated that in this example, the number of value matrix entries stored in the first memory is greater than or equal to the group size parameter G. In other examples when the number of value matrix entries stored in the first memory is less than the group size parameter G, the methodology will wait until additional value matrix entries are stored in the first memory (e.g., upon additional inference the generative model) or data padding matrix values will be added to the first memory for quantization as discussed below. At step 410, data quantization is executed on the first group of value matrix entries. In an example, the data quantization is block-based quantization. Quantization enables the model to perform operations with the quantized values more efficiently (e.g., integer arithmetic is less computationally demanding than floating point arithmetic, etc.) without a substantial reduction in the model's accuracy. In some examples, quantized data blocks share scale and bias factors which can decrease quantization error and make the block more resilient to outlier values. In some examples, a plurality of blocks may be grouped into a super-block. The blocks within a super-block also share an additional scale and bias factor (e.g., super-block scale and super-block bias) in addition to the block-wise scale and bias factor. The use of super-block quantization further decreases quantization error and makes the entire super-block more resilient to outlier values within the super-block. The values within a block (and/or super block) are quantized together in order to maintain consistent scale and bias values.

At step 412, the quantized value matrix is stored in a second memory. In an example, the second memory is DRAM of memory 106. When the quantized value matrix is stored in the second memory, any temporary quantized data is overwritten. At step 414, the methodology determines whether data is remaining in the first memory (e.g., after quantization has been performed and the first group of data has been deleted). If there is no data remaining in the first memory, the methodology deletes the first group of value matrix entries in the first memory at step 418. The methodology continues to step 420 where the quantized value matrix is retrieved from the second memory during execution of the generative model. It is appreciated that the generative model may retrieve more than the quantized value matrix (e.g., the model may retrieve all prior computed quantized value matrix entries, for example, column by column within the second memory). The methodology ends at step 421. In some examples, the methodology may restart upon the generative model 108 processing a next input token.

Returning to step 414, if data does remain in the first memory, the methodology proceeds to step 416. At step 416 a second stage processing methodology begins. At step 422, the first group of value matrix entries is deleted. At step 424, remainder value matrix entries are identified (e.g., values that were not part of the first quantization group). At step 426, data padding matrix values are generated as needed to reach a full quantization group size G. In an example, the data padding matrix entries, when combined with the remainder value matrix entries, are equal to the group size G. The values in the data padding matrix are selected so as to not influence the values in the remainder value matrix entries. For example, the data padding matrix values comprise values that are between the minimum and maximum value for a column of the remainder value matrix entries. In one example, the data padding matrix values are the last value in each column of the remainder value matrix entries.

At step 428 a second group of value matrix entries is identified, the second group of value matrix entries comprising the remainder value matrix entries and the data padding matrix entries. At step 430 data quantization is executed on the second group of value matrix entries. The second quantized value matrix is then stored in the second memory at 432. In some examples, the second quantized value matrix overwrites a prior temporary quantized value matrix (e.g., containing less than a full quantization group, containing one or more data padding values, etc.) At 434, the second quantized value matrix is retrieved during execution of the generative model (e.g., generative model 108). In one example, the quantized values corresponding to the data padding matrix are ignored, whereby the generative model uses only the quantized values corresponding to the remainder value matrix entries when generating the next token.

At step 436, the methodology determines if less than a full quantization group remains in the first memory (e.g., according to the group size parameter G). If a full quantization group is stored in the first memory, the methodology ends at step 440. In some examples, the methodology may restart upon the generative model 108 processing a next input token. If there is less than a full quantization group remaining in the first memory, the methodology proceeds to step 438 where it is determined if a new output token has been generated (e.g., resulting in a new value matrix entry).

If a new output token is being generated, the methodology returns to step 424. If no new output token is being generated the methodology ends at step 440. It is appreciated that the above described methodology can be repeated for each output token generated by the generative model (e.g., generative model 108).

Referring now to FIG. 5 an example methodology 500 for runtime data quantization during execution of a generative model is illustrated. At step 502, the methodology begins. At step 504, all available value matrix entries are computed (e.g., for every outstanding token to be processed). At step 506, the computed value matrix entries are stored in a first memory (e.g., NPU memory 118). In some examples, the first memory is SRAM. At step 508, the methodology determines if the value matrix entries stored in the first memory (not including any padding data) are equal to or greater than group size parameter G which defines the number of rows of data in a quantization block.

If the methodology determines at step 508 that there is not a full group of value matrix entries in the first memory, the methodology proceeds to step 510 and generates data padding matrix entries. In an example, the data padding matrix entries, when combined with the value matrix entries in the first memory, are equal to the group size G. The values in the data padding matrix are selected so as to not influence the other value matrix entries. For example, the data padding matrix values comprise values that are between the minimum and maximum value for a column of the value matrix entries. In one example, the data padding matrix values are the last value in each column of the value matrix entries in the first memory.

At step 512, data quantization is performed on the entries in the first memory (e.g., the value matrix entries and any padding data matrix values). The quantized data values are stored in a second memory (e.g., memory 106) at step 514. In some examples, the second memory is DRAM. At step 516, the next write address for the second memory is reset (e.g., to the same address in the second memory where the quantized data values were stored in step 514) in order to overwrite the values in the second memory during the next write to the second memory (e.g., during the processing of the next inference. At step 528, the quantized value matrix data can be retrieved from the second memory during execution of the generative model (e.g., generative model 108). At step 530, the methodology waits for the next computed inference of the generative model, whereby upon a new inference, the methodology returns to step 504 to compute available value matrix entries.

Returning to step 508, if a full group of value matrix entries is determined to be stored in the first memory, the methodology proceeds to step 518. At step 518, data quantization is executed for the full group of value matrix entries. At step 520, the quantized values are stored in the second memory. At step 522, the next write address of the second memory is incremented to prevent the quantized values in the second memory from being overwritten. At step 524, the full group of value matrix entries (e.g., that were just quantized) are deleted from the first memory. At step 526, the methodology determines if there are remainder value matrix entries in the first memory (e.g., entries that were not deleted as part of the first group of value matrix entries). If there are remainder value matrix entries, the methodology returns to step 508, where the methodology again determines if there is a full group of value matrix entries in the first memory (e.g., according to group size parameter G), and proceeds as discussed above. If the methodology determines at step 526 that no value matrix entries remain in the first memory, the methodology proceeds to step 528 where the quantized value matrix data can be retrieved from the second memory during execution of the generative model (e.g., generative model 108). At step 530, the methodology waits for the next computed inference of the generative model, whereby upon a new inference, the methodology returns to step 504 to compute available value matrix entries.

Figure 6:
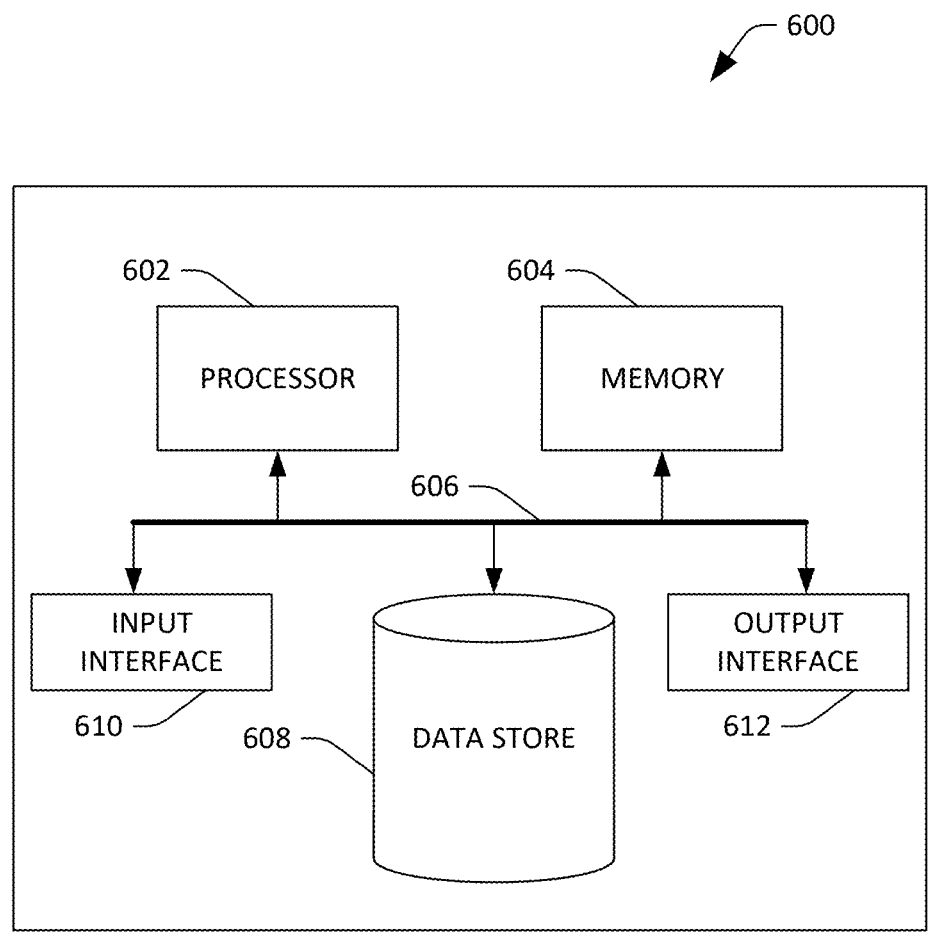
FIG. 6 illustrates an example computing device.

Referring now to FIG. 6, a high-level illustration of an example computing device 600 that can be used in accordance with the systems and methodologies disclosed herein is illustrated (e.g., client computing device 101, computing system 102, etc.). The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606.

The computing device 600 additionally includes a data store 608 that is accessible by the processor 602 by way of the system bus 606. The data store 608 may include executable instructions, computer-readable text that includes words, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 by way of the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

The present disclosure relates to runtime data quantization during execution of a generative model according to at least the following examples:

(A1) In one aspect, some embodiments include a method (e.g., 400, 500) executed by a processor (e.g., processor 104,) of a computing system (e.g., computing system 102). The method comprises computing a first value matrix entry. The method additionally comprises storing the first value matrix entry in a first memory (e.g., NPU memory 118), wherein the first memory stores value matrix entries computed during execution of a generative model. The method further comprises identifying a first group of value matrix entries stored in the first memory according to a group size parameter, wherein the value matrix entries stored in the first memory are greater than or equal to the group size parameter. The method additionally comprises executing data quantization on the first group of value matrix entries, wherein the data quantization produces a result comprising a first quantized value matrix comprising a plurality of quantization block values. The method additionally comprises storing the first quantized value matrix in a second memory (e.g., memory 106). The method further comprises retrieving the first quantized value matrix from the second memory during execution of the generative model.

(A2) According to some embodiments of the method of A1, deleting the first group of value matrix entries stored in the first memory. The method additionally comprises identifying one or more remainder value matrix entries remaining in the first memory subsequent to deleting the first group of value matrix entries. The method further comprises generating one or more data padding matrix entries based upon the remainder value matrix entries. The method additionally comprises storing the data padding matrix entries in the first memory. The method further comprises identifying a second group of value matrix entries stored in the first memory, wherein the second group of value matrix entries comprises the remainder value matrix entries and the data padding matrix entries. The method additionally comprises executing data quantization on the second group of value matrix entries, wherein the data quantization produces a result comprising a second quantized value matrix and storing the second quantized values matrix in the second memory. The method further comprises retrieving the first quantized value matrix and the second quantized value matrix from the second memory during execution of the generative model.

(A3) According to some embodiments of any of the methods of (A1)-(A2), the first memory is static-random access memory (SRAM) and the second memory is dynamic random access memory (DRAM).

(A4) According to some embodiments of any of the methods of (A1)-(A3), storing the first value matrix in the first memory comprises vertically concatenating the first value matrix entry with prior value matrix entries stored in the first memory.

(A5) According to some embodiments of any of the methods of (A1)-(A4), the first quantized value matrix comprises a plurality of horizontally concatenated data blocks.

(A6) According to some embodiments of any of the methods of (A1)-(A5), the second group of value matrix entries is in a floating point data format and the second quantized value matrix is in an integer data format.

(A7) According to some embodiments of any of the methods of (A1)-(A6), the method further comprises, subsequent to retrieving the first quantized value matrix and the second quantized value matrix from the second memory during execution of the generative model, the method further comprises executing a self-attention computation based upon data including the first quantized value matrix and the second quantized value matrix.

(A8) According to some embodiments of the method of (A7), the self-attention computation excludes quantized data padding matrix values within the second quantized value matrix.

(A9) According to some embodiments of any of the methods of (A1)-(A8), the method further comprises computing a second value matrix entry. The method additionally comprises storing the second value matrix entry in the first memory, wherein the second value matrix entry is vertically concatenated with the remainder value matrix entries stored in the first memory. The method further comprises identifying a third group of value matrix entries stored in the first memory, wherein the third group of value matrix entries comprises the remainder value matrix entries and the second value matrix entry and is equal to the group size parameter. The method additionally comprises executing data quantization on the third group of value matrix entries, wherein the data quantization produces a result comprising a third quantized value matrix. The method further comprises storing the third quantized value matrix in the second memory. The method additionally comprises retrieving the first quantized value matrix and the third quantized value matrix from the second memory during execution of the generative model.

(A10) According to some embodiments of any of the methods (A7)-(A9), storing the third quantized value matrix in the second memory comprises overwriting the second quantized value matrix in the second memory.

(A11) According to some embodiments of any of the methods (A7)-(A10), the method additionally comprises, subsequent to retrieving the first quantized value matrix and the second quantized value matrix from the second memory during execution of the generative model, executing a self-attention computation based upon data including the first quantized value matrix and the second quantized value matrix.

(A12) According to some embodiments of any of the methods (A1)-(A11), the one or more data padding matrix entries comprise at least one of: a minimum value for a column in the remainder value matrix entries, a maximum value for a column in the remainder value matrix entries, or the last value in a column in the remainder value matrix entries.

(B1) In another aspect, some embodiments include a computing system (e.g., computing system 102) that includes one or more processors (e.g., processor 104, etc.) and memory (e.g., memory 106, NPU memory 118, etc.). The memory stores instructions that, when executed by at least one of the one or more processors, cause the one or more processors to perform any of the methods described herein (e.g., any of A1-A12).

(C1) In yet another aspect, some embodiments include a non-transitory computer-readable storage medium that includes instructions that, when executed by at least one processor (e.g., processor 104) of a computing system (e.g., computing system 102), cause the at least one processor to perform any of the methods described herein (e.g., any of A1-A12).

Various functions described herein can be implemented in hardware, firmware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", "model" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   at least one processor; and
   memory comprising at least a first memory and a second memory, wherein the memory stores instructions that, when executed by the at least one processor, cause the at least one processor to execute a generative model and perform acts comprising:
   computing a first value matrix entry;
   storing the first value matrix entry in a first memory, wherein the first memory stores value matrix entries computed during execution of the generative model;
   identifying a first group of value matrix entries stored in the first memory according to a group size parameter, wherein the value matrix entries stored in the first memory are greater than or equal to the group size parameter;
   executing data quantization on the first group of value matrix entries, wherein the data quantization produces a result comprising a first quantized value matrix comprising a plurality of quantization block values;
   storing the first quantized value matrix in a second memory; and
   retrieving the first quantized value matrix from the second memory during execution of the generative model.

2. The computing system of claim 1, further comprising:
   deleting the first group of value matrix entries stored in the first memory;
   identifying one or more remainder value matrix entries remaining in the first memory subsequent to deleting the first group of value matrix entries;
   generating one or more data padding matrix entries based upon the remainder value matrix entries;
   storing the data padding matrix entries in the first memory;
   identifying a second group of value matrix entries stored in the first memory, wherein the second group of value matrix entries comprises the remainder value matrix entries and the data padding matrix entries;
   executing data quantization on the second group of value matrix entries, wherein the data quantization produces a result comprising a second quantized value matrix;
   storing the second quantized value matrix in the second memory; and
   retrieving the first quantized value matrix and the second quantized value matrix from the second memory during execution of the generative model.

3. The computing system of claim 2, wherein the second group of value matrix entries is in a floating point data format and the second quantized value matrix is in an integer data format.

4. The computing system of claim 2, further comprising:
subsequent to retrieving the first quantized value matrix and the second quantized value matrix from the second memory during execution of the generative model, executing a self-attention computation based upon data including the first quantized value matrix and the second quantized value matrix.

5. The computing system of claim 4, wherein the self-attention computation excludes quantized data padding matrix values within the second quantized value matrix.

6. The computing system of claim 4, further comprising:
computing a second value matrix entry;
storing the second value matrix entry in the first memory, wherein the second value matrix entry is vertically concatenated with the remainder value matrix entries stored in the first memory;
identifying a third group of value matrix entries stored in the first memory, wherein the third group of value matrix entries comprises the remainder value matrix entries and the second value matrix entry and is equal to the group size parameter;
executing data quantization on the third group of value matrix entries, wherein the data quantization produces a result comprising a third quantized value matrix;
storing the third quantized value matrix in the second memory;
retrieving the first quantized value matrix and the third quantized value matrix from the second memory during execution of the generative model.

7. The computing system of claim 6, wherein storing the third quantized value matrix in the second memory comprises overwriting the second quantized value matrix in the second memory.

8. The computing system of claim 7, further comprising:
subsequent to retrieving the first quantized value matrix and the second quantized value matrix from the second memory during execution of the generative model, executing a self-attention computation based upon data including the first quantized value matrix and the second quantized value matrix.

9. The computing system of claim 1, wherein the first memory is static-random access memory (SRAM) and the second memory is dynamic random access memory (DRAM).

10. The computing system of claim 1, wherein storing the first value matrix in the first memory comprises vertically concatenating the first value matrix entry with prior value matrix entries stored in the first memory.

11. The computing system of claim 10, wherein the first quantized value matrix comprises a plurality of horizontally concatenated data blocks.

12. The computing system of claim 1, wherein the one or more data padding matrix entries comprise at least one of: a minimum value for a column in the remainder value matrix entries, a maximum value for a column in the remainder value matrix entries, or the last value in a column in the remainder value matrix entries.

13. A method, the method comprising:
computing a first value matrix entry;
storing the first value matrix entry in a first memory, wherein the first memory stores value matrix entries computed during execution of a generative model;
identifying a first group of value matrix entries stored in the first memory according to a group size parameter, wherein the value matrix entries stored in the first memory are greater than or equal to the group size parameter;
executing data quantization on the first group of value matrix entries, wherein the data quantization produces a result comprising a first quantized value matrix comprising a plurality of quantization block values;
storing the first quantized value matrix in a second memory; and
retrieving the first quantized value matrix from the second memory during execution of the generative model.

14. The method of claim 13, further comprising:
deleting the first group of value matrix entries stored in the first memory;
identifying one or more remainder value matrix entries remaining in the first memory subsequent to deleting the first group of value matrix entries;
generating one or more data padding matrix entries based upon the remainder value matrix entries;
storing the data padding matrix entries in the first memory;
identifying a second group of value matrix entries stored in the first memory, wherein the second group of value matrix entries comprises the remainder value matrix entries and the data padding matrix entries;
executing data quantization on the second group of value matrix entries, wherein the data quantization produces a result comprising a second quantized value matrix;
storing the second quantized value matrix in the second memory;
retrieving the first quantized value matrix and the second quantized value matrix from the second memory during execution of the generative model.

15. The method of claim 14, further comprising:
computing a second value matrix entry;
storing the second value matrix entry in the first memory, wherein the second value matrix entry is vertically concatenated with the remainder value matrix entries stored in the first memory;
identifying a third group of value matrix entries stored in the first memory, wherein the third group of value matrix entries comprises the remainder value matrix entries and the second value matrix entry and is equal to the group size parameter;
executing data quantization on the third group of value matrix entries, wherein the data quantization produces a result comprising a third quantized value matrix;
storing the third quantized value matrix in the second memory;
retrieving the first quantized value matrix and the third quantized value matrix from the second memory during execution of the generative model.

16. The method of claim 15, wherein storing the third quantized value matrix in the second memory comprises overwriting the second quantized value matrix in the second memory.

17. The computing system of claim 13, wherein the first memory is static-random access memory (SRAM) and the second memory is dynamic random access memory (DRAM).

18. The computing system of claim 13, wherein storing the first value matrix in the first memory comprises vertically concatenating the first value matrix entry with prior value matrix entries stored in the first memory, and wherein the first quantized value matrix comprises a plurality of horizontally concatenated data blocks.

19. A computer-readable storage medium comprising instructions that, when executed by at least one processor of a computing system, cause the at least one processor to perform acts comprising:

computing a first value matrix entry;

storing the first value matrix entry in a first memory, wherein the first memory stores value matrix entries computed during execution of the generative model;

identifying a first group of value matrix entries stored in the first memory according to a group size parameter, wherein the value matrix entries stored in the first memory are greater than or equal to the group size parameter;

executing data quantization on the first group of value matrix entries, wherein the data quantization produces a result comprising a first quantized value matrix comprising a plurality of quantization block values;

storing the first quantized value matrix in a second memory; and retrieving the first quantized value matrix from the second memory during execution of the generative model.

20. The computer-readable storage medium of claim 19, further comprising:

deleting the first group of value matrix entries stored in the first memory;

identifying one or more remainder value matrix entries remaining in the first memory subsequent to deleting the first group of value matrix entries;

generating one or more data padding matrix entries based upon the remainder value matrix entries;

storing the data padding matrix entries in the first memory;

identifying a second group of value matrix entries stored in the first memory, wherein the second group of value matrix entries comprises the remainder value matrix entries and the data padding matrix entries;

executing data quantization on the second group of value matrix entries, wherein the data quantization produces a result comprising a second quantized value matrix;

storing the second quantized value matrix in the second memory; and retrieving the first quantized value matrix and the second quantized value matrix from the second memory during execution of the generative model.

* * * * *